March 8, 1966
C. E. TIRRELL
3,239,442
METHOD FOR ELECTRODIALYSIS OF SOLUTIONS
AND APPARATUS THEREFOR
Filed Oct. 3, 1957
2 Sheets-Sheet 1
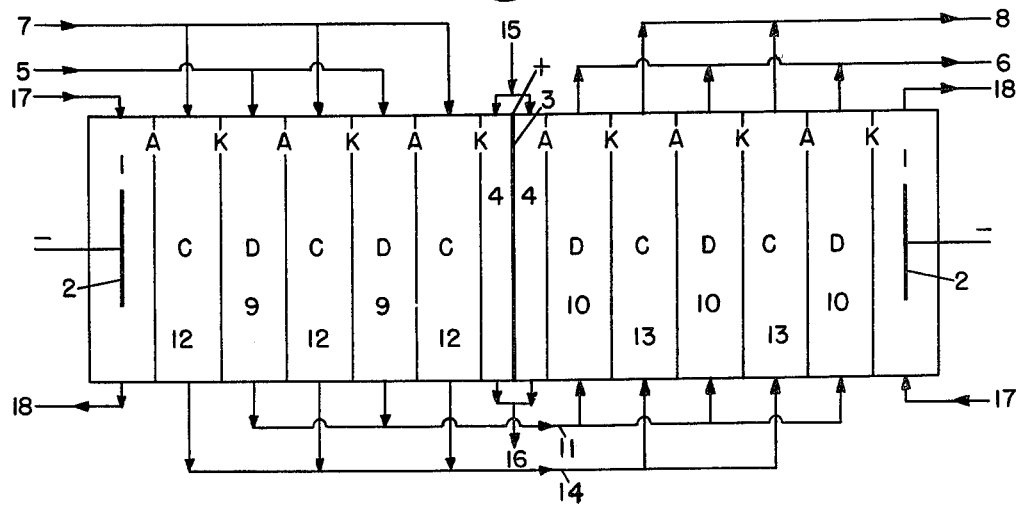
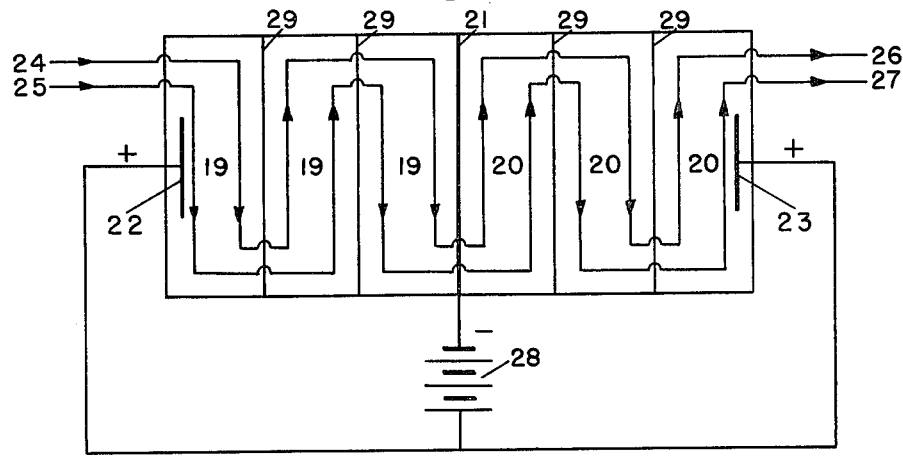
Inventor:
Charles E. Tirrell,
by
Attorney March 8, 1966  C. E. TIRRELL  3,239,442
METHOD FOR ELECTRODIALYSIS OF SOLUTIONS
AND APPARATUS THEREFOR
Filed Oct. 3, 1957  2 Sheets-Sheet 2
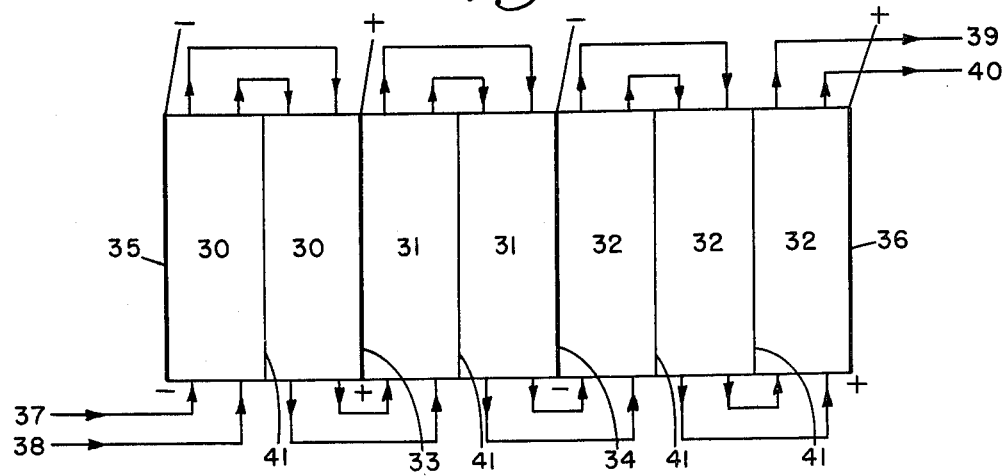
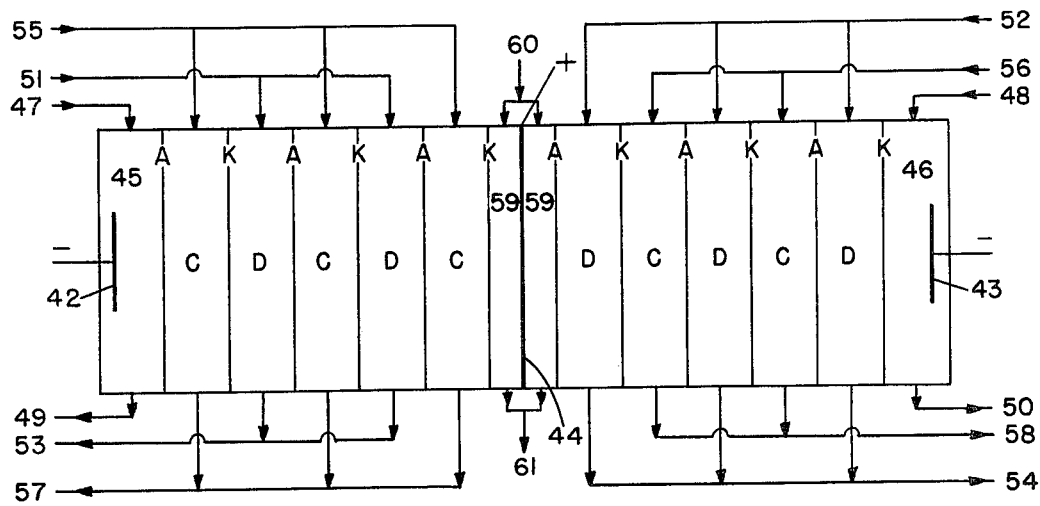
Inventor:
Charles E. Tirrell,
by
Attorney

United States Patent Office 3,239,442
Patented Mar. 8, 1966

3,239,442
METHOD FOR ELECTRODIALYSIS OF SOLUTIONS
AND APPARATUS THEREFOR
Charles E. Tirrell, Nahant, Mass., assignor to Ionics, Incorporated, Cambridge, Mass., a corporation of Massachusetts
Filed Oct. 3, 1957, Ser. No. 688,004
19 Claims. (Cl. 204—180)

The present invention relates to processes and apparatus for the deionization of electrolyte solutions in an electrodialysis cell comprising a plurality of concentrating and diluting chambers defined by permselective membranes and more particularly to the utilization of an electrode common to two groups of said concentrating and diluting chambers.

An electrodialysis cell comprising a plurality of alternate concentrating and diluting chambers defined by cation and anion permselective membranes and disposed between two end electrodes is well known. Also known is the principle of internal staging as disclosed by patent application Ser. No. 642,225 filed February 25, 1957, now abandoned, whereby the effluent solution from one set of analogous chambers (diluting and/or concentrating) is passed as influent feed to a subsequent set of analogous chambers within the same electrodialysis cell and between one pair of end electrodes.

Such a set of chambers is termed a "stage." The application cited above discloses a method of combining a plurality of stages between two end electrodes. This invention contemplates an improvement over known internal staging methods by inserting an electrode between two of said stages. This electrode is common to both stages; that is current flows in opposite directions through the adjoining stages between two end electrodes of one charge and the intermediate common electrode of opposite charge. It is understood that the "common" electrode is not limited to the division of internal stages in a single cell but may separate groups of diluting and concentrating chambers, each a distinct electrodialysis cell, the separating electrode being common to each cell.

U.S. Patent No. 2,767,135 of October 16, 1956, discloses a method for transferring ionizable salts from one solution to another whereby a series of common electrodes are separated by one diluting and one concentrating chamber, said electrodes being reversibly retentive and emissive of one of the ionic species in one electrolyte solution. In the present invention, however, electrodes common to two groups of diluting and concentrating chambers control the amount of current passed through said chambers; furthermore any number of diluting and concentrating chambers may be disposed between said electrodes.

Electrodialysis cells heretofore known comprised two end electrodes and a plurality of diluting and concentrating chambers disposed between. It is apparent that between the two end electrodes a constant current passes through the successive chambers. Hence the current density throughout the cell is also constant. If a plurality of stages, that is sets of diluting and concentrating chambers, are disposed between two end electrodes then the concentration of solution in the diluting chambers decreases in each successive stage. It is clear that in one stage the ratio of current density to concentration ($CD/N$ where CD is the current density and N is the average concentration of the diluting stream in the stage) will be greater than $CD/N$ in the prior stage and less than $CD/N$ in the subsequent stage.

As disclosed in U.S. Patent No. 2,708,658 issued May 17, 1955 to N. W. Rosenberg the ratio of current density to the concentration of the solution ($CD/N$) in an electrodialysis cell affects polarization of the ions in solution adjacent to the membrane surface. If polarization occurs, resistance of the cell increases, and current efficiency drops. The economically optimum current is therefore often the highest current that can be passed without causing polarization; that is the $CD/N$ ratio may not exceed critical limits.

When a plurality of stages are interposed between two electrodes, the concentration of the solution to be diluted is reduced through successive stages until the ratio of $CD/N$ exceeds critical limits. Therefore internal staging between a single pair of electrodes has practical application only where relatively concentrated solutions are to be demineralized and high $CD/N$ ratios are not obtained. An example is the reduction of the salinity of sea water from 3.5% to about 1% where the cell may be operated at constant current density without approaching critical values of $CD/N$.

The preferred application of the present invention is an improvement over the method and apparatus of internal staging as disclosed in the patent application cited above whereby an internally-staged demineralizing unit can be operated at a constant ratio of current density to concentration. The consequent advantages of an internally staged unit, low cost construction, highly efficient operation, and minimum space requirements are achieved by inserting a common electrode between two of said stages and passing current between the common electrode and the two oppositely charged end electrodes. The common electrode may be either a common anode, a common cathode or a succession of common electrodes inserted between various stages.

The present invention insures a uniform flow distribution in the chambers while at the same time preventing electrode reaction in the metal pipes or fittings. In electrodialysis units containing only two end electrodes at a potential difference, one electrode for example the cathode, is grounded to prevent leakage current from the electrode to ground. Leakage current from the other electrode can be transferred through any electrolyte in contact with the electrode. To minimize leakage current from the other electrode, for example the anode, the influent stream is introduced at the cathode or grounded end of the unit; likewise the effluent stream is withdrawn at the same end. The solutions in both influent and effluent conduits being at ground potential, there is no leakage current from the cathode to cause the leakage current electrode reaction on metal pipes or fittings. However, where the effluent solutions must be withdrawn at the same end of the unit as that at which the influent solutions are introduced, a uniform flow distribution through the electrodialysis chambers is not obtained because the length of flow path is not uniform.

However, it is apparent that if at least one common electrode is disposed between two end electrodes of like charge and the two end electrodes are grounded there would be no leakage current from the end electrodes, and solutions entering or leaving at either end would be at ground potential. Therefore in the present invention the influent solution may be introduced at one end of the electrodialysis unit and the effluent solutions withdrawn at the other. The liquids flow in parallel through multiple stages in equivalent flow paths; uniform flow distribution through all chambers is thereby obtained.

It is understood that a common electrode is not limited to an internally staged unit, but may be employed to divide two separate electrodialysis cells. Space requirements would thereby be reduced, one electrode is eliminated, and different currents may still be passed through each cell. A common electrode between two separate cells has particular application where only a low voltage power supply is available; higher current is obtained in two separate units of fewer chambers than in one larger unit. The advantage of uniform flow distribution is not realized however, where the chambers on each side of the common electrode are not internally staged.

It is the object of this invention to deionize electrolyte solutions in a more efficient, economical manner than by previously known means.

Another object of this invention is to remove a greater proportion of the ions in an electrolyte solution by means of a multi-stage electrodialysis unit than could be removed in a single stage unit.

It is also an object of this invention to maintain approximately constant relation between current density and concentration of the diluting stream in an internally staged electrodialysis unit to prevent polarization.

A further object of this invention is to demineralize solutions in two separate electrodialysis units at a higher current than would be obtainable at a given voltage in a single larger unit.

The present invention and its preferred embodiments can be more easily understood by reference to the following drawings in which:

FIGURE 1 is a schematic diagram of two stages separated by a common electrode.

FIGURE 2 is a schematic diagram of six internal stages between end anodes and a common cathode dividing the internal stages into two groups of three.

FIGURE 3 is a schematic diagram of seven internal stages between an end cathode and an end anode, two common electrodes dividing the internal stages into two groups of two and one group of three stages.

FIGURE 4 is a schematic diagram of a common anode interposed between two separate electrodialysis cells.

The drawing in FIGURE 1 shows a preferred embodiment of this invention, a common electrode separating internal stages of an electrodialysis unit which comprises a plurality of concentrating chambers C and diluting chambers D defined by anion permselective membranes A and cation permselective membranes K. It is understood that each stage may comprise any number of diluting and concentrating chambers.

The plurality of diluting and concentrating chambers are disposed between two end cathode chambers 1 and two end cathodes 2. Said chambers are separated into groups by common anode 3 and anode chamber 4. While the drawing shows two internal stages for purposes of illustration it is understood that any number of internal stages can be disposed between said common electrode and said end electrodes. The solution to be diluted is fed into the diluting chambers through influent conduit 5 and withdrawn from the cell through effluent conduit 6. The solution to be concentrated enters the concentrating chambers through influent conduit 7 and is withdrawn from the cell through effluent conduit 8. As shown diagrammatically, the effluent from the diluting chamber 9 is combined and fed as influent to diluting chambers 10 through internal manifold 11 while effluent from concentrating chambers 12 is combined and fed as influent to concentrating chambers 13 through internal manifold 14.

The group of diluting 9 and concentrating chambers 12 comprises the first stage of the cell while the set of diluting 10 and concentrating chambers 13 comprises the second stage of the cell. The two stages are separated by anode chamber 4 and common anode 3 which is an impermeable sheet of a non-corrodible material such as platinum. Electrolyte solution is passed through the anode chamber by means of influent conduit 15 and effluent conduit 16, while the cathode feed stream is introduced into the cathode chambers through conduits 17 and withdrawn through conduits 18.

In operation, a constant voltage is applied across the two end cathodes and the common anode. The solutions to be diluted, for example brackish water, and the solution to be concentrated are fed into the cell through conduits to the diluting 9 and concentrating 12 chambers of the first stage. With a constant voltage E across both the first and second stages the current through the first stage I depends upon the resistance of the electrolyte solutions and membranes in the first stage. The resistance of permselective membranes of types disclosed in U.S. Patent No. 2,636,851 of April 28, 1953, is of the order of magnitude of brackish water which is fed into the diluting chambers. Since the resistance of the diluting stream increases with dilution, the resistance of a plurality of diluting and concentrating chambers is largely determined by the concentration of the diluting stream.

If the resistance of the first stage for a given concentration $N_1$ of feed to the diluting chambers is $R_1$, the current passing will be $E/R_1$. Now if a fixed percentage, for example 50%, of the dissolved salt is removed in the diluting chambers 9, the effluent which is combined and fed into diluting chambers 10 of the second stage will be at a concentration $N_2$ which equals $N_1/2$ if 50% of the salt is removed in the first stage. The resistance $R_2$ of the second stage which is primarily dependent upon the concentration of the diluting stream will be approximately equal to $2R_1$ since the concentration $N_2=N_1/2$. Therefore the current passing through the second stage $I_2$ will be $E/R_2$ or $E/R_1$. The current in the second stage equals approximately one half the current in the first stage, $I_2=\frac{1}{2}I_1$. Since $N_2=\frac{1}{2}N_1$, the ratio of current density to normality $CD/N$ remains about the same in the first and second stages. It is apparent, therefore, that voltage may be regulated to give the optimum ion transfer without exceeding critical limits of $CD/N$. An internally staged unit can thus be operated at optimum conditions of current density by means of a common electrode.

In FIGURE 2 three internal stages 19 are separated from three subsequent internal stages 20 by a common cathode 21. It is understood that each stage comprises a plurality of alternate diluting and concentrating chambers defined by anion and cation permselective membranes and that the effluent from the diluting chambers of one stage is combined and fed internally as influent to the diluting chambers of the subsequent stage. Likewise the effluent from the concentrating chambers of one stage is combined and fed internally as influent to the concentrating chambers of the subsequent stage. It is also understood that any number of internal stages may be separated into groups by a common electrode. A direct electric current can be passed through stages 19 and stages 20 between common cathode 21 and the end anodes 22, 23. Influent diluting and concentrating streams enter the electrodialysis unit through influent manifolds 24 and 25 and depart through effluent manifolds 26 and 27 respectively at the opposite end of the unit. Positive leads from direct current source 28 are connected to the end anodes; the negative lead is connected to the common cathode. Ion selective membranes 29 separate the internal stages as shown schematically in the drawing.

In operation, the influent diluting stream is diluted in successive steps through internal stages 19 while direct current passes through membranes and chambers between common cathode 21 and end anode 22. In the subsequent internal stages 20, the diluting stream is further diluted in successive steps, direct current passing between common cathode 21 and end anode 23. As outlined above, electrical resistance of the three subsequent stages 20 is greater than the resistance of the three prior stages 19 so that proportionally less current is passed through the subsequent stages and a constant ratio of current density to concentration, $CD/N$ is maintained. It is noted that if the end anodes are grounded, the influent and effluent liquids are at ground potential: there is no leakage current; and no electrode reaction occurs in the pipes. Also a uniform parallel flow of diluting and concentrating streams is attained.

Though FIGURE 2 shows a common cathode between two end anodes, it is more economical to employ a common anode between two end cathodes. The anode reaction in a demineralization plant as herein described produces a highly corrosive mixture of chlorine and oxygen gases, necessitating the use of an anode composed of non-corrodible material, usually noble metal such as platinum. Due to the high cost of such material, capital investment is reduced by employing one common anode rather than two end anodes. Since the cathode reaction is weakly basic, little corrosion of the cathode occurs; and low cost materials such as steel mesh are suitable.

In FIGURE 3 a plurality of common electrodes separate the internal stages of an electrodialysis unit. In the drawing, seven internal stages 30, 31, and 32 are separated into groups by common anode 33 and common cathode 34. It is understood that each internal stage comprises a plurality of alternate diluting and concentrating chambers defined by anion and cation permselective membranes and that the effluent from the diluting chambers of one stage is combined and fed internally as the influent to the diluting chambers of the subsequent stage. Likewise the effluent from the concentrating chambers of one stage is combined and fed internally as influent to the concentrating chambers of the subsequent stage. It is also understood that any number of common electrodes can be disposed between end electrodes and that any number of stages may be included between electrodes. The two end electrodes are oppositely charged in this unit, a cathode 35 and an anode 36. Influent diluting and concentrating streams are fed into the unit through influent manifolds 37 and 38 respectively at the cathode end, and effluent streams are withdrawn through effluent manifolds 39 and 40 respectively at the opposite end. Each group of stages is defined by two electrodes, and the stages are separated by ion selective membranes 41.

In operation, the liquids to be diluted and concentrated pass successively through each internal stage as described above. Positive leads from a constant voltage direct current source are connected to anodes 33 and 36, negative leads to cathodes 34 and 35. Because the resistance of the stages increases as the diluting stream is diluted, the current through stages 30 between common anode 33 and end cathode 35 will be greater than the current through stages 31 between common anode 33 and common cathode 34; similarly the latter will be greater than current through stages 32 between common cathode 34 and end anode 36. However in each of the three groups of stages approximately the same ratio of current density to concentration, $CD/N$, is maintained.

FIGURE 4 shows two separate electrodialysis units divided by a common electrode. In each unit a plurality of diluting chambers D and concentrating chambers C are defined by anion A and cation K permselective membranes. A direct electric current may be passed through two end cathodes 42 and 43 and a common anode 44; said common anode separating the two units. Through the end cathode chambers 45 and 46 an electrolyte feed stream is passed by means of influent conduits 47 and 48 and effluent conduits 49 and 50 respectively. Solutions to be diluted are fed to diluting chambers in the respective units through influent manifolds 51 and 52 while the diluting stream is withdrawn through effluent manifolds 53 and 54 respectively. Similarly the solutions to be concentrated are fed to the concentrating chambers in the respective units through influent 55 and 56 and withdrawn through effluent manifolds 57 and 58 respectively. Through the anode chamber 59 on either side of the common anode 44, an electrolyte feed stream is passed by means of influent conduit 60 and effluent conduit 61. Each separate electrodialysis unit may comprise any number of concentrating and diluting cells. Though the drawing shows two separate units, it is understood that a plurality of common electrodes may be used to divide concentrating and diluting chambers into any number of separate, distinct electrodialysis units.

As noted from the drawing, the influent solutions enter each respective unit at the cathode end and the effluent solutions are withdrawn at the same end of the units to maintain the same potential on both influent and effluent liquids. It is also noted that the length of flow paths through the chambers are variable since both influent and effluent manifolds are at the same end of the cell.

The demineralizer above operates as two distinct electrodialysis units with the exception that the two units have a common anode. Current passing through each unit can be varied by changing the resistance of each unit by means of a resistor or by altering the number of chambers. This embodiment of the invention has particular application where available power supplies are low voltage direct current. A common electrode between two separate units enables twice the current to be passed through a given number of chambers as could be passed through the same number with only end electrodes. Higher current densities at low voltage on the membrane surface are thereby attainable by inserting a common electrode between two end electrodes and operating each set of diluting and concentrating chambers as a separate unit.

The following example illustrates the principles and preferred embodiments of the invention, but it is understood that the invention is not limited thereto.

*Example*

A two stage electrodialysis unit similar to that shown in FIGURE 1 was assembled with five concentrating and five diluting chambers alternately disposed in each stage. The concentrating and diluting chambers were defined by anion and cation permselective membranes of types well known. Direct electric current was passed between a common cathode which separated the two internal stages. An electrolyte solution was continuously passed through the electrode chambers.

A 0.0100 N solution of NaCl was fed as influent to both concentrating and diluting chambers of the first stage, while the effluent diluting and concentrating streams of the first stage were fed as influent to the diluting and concentrating chambers of the second stage, respectively. The rate of flow of the influent 0.0100 N NaCl solution, the amount of direct current, and the voltage were varied to determine the percentage demineralization of the diluting stream under different conditions. The following table shows the concentrations of both streams as the current, voltage, and influent flow rates were varied:

TABLE

| Run | Volts | Stage 1 | Stage 2 | Flow Rate, g.p.h./chamber | | Normality as NaCl | | | |
|---|---|---|---|---|---|---|---|---|---|
| | | | | | | Dilute Product | | | Waste—Stage 2 |
| | | | | C | D | Feed | Stage 1 | Stage 2 | |
| 1 | 3.9 | 0.37 | 0.30 | 1.8 | 1.8 | 0.010 | 0.0081 | 0.0066 | 0.0131 |
| 2 | 3.6 | 0.30 | 0.27 | 3.3 | 3.3 | 0.010 | 0.0087 | 0.0075 | 0.0116 |
| 3 | 12.6 | 1.91 | 0.79 | 3.3 | 3.3 | 0.010 | 0.0042 | 0.0018 | 0.0185 |
| 4 | 5.4 | 0.57 | 0.48 | 5.2 | 5.2 | 0.010 | 0.0087 | 0.0076 | 0.0113 |
| 5 | 22.6 | 3.74 | 1.36 | 5.2 | 5.2 | 0.010 | 0.0037 | 0.0014 | 0.0192 |

It is apparent from the above data that the difference in the current passing through Stage 1 and the current passing through Stage 2 is greater when a larger percent demineralization is effected. This difference is primarily due to the greater resistance of the diluted solution. In Run #5, for example, the current through Stage 1 was 3.74 amperes while the average concentration of the diluting stream in this stage was $$0.0068 \text{ N} \left(\frac{0.0100 + 0.0037}{2}\right)$$

The current through Stage 2 was 1.36 amperes while the average concentration of the diluting stream in this stage was $$0.0025 \text{ N} \left(\frac{0.0037 + 0.0014}{2}\right)$$

The ratio of current density to concentration in the two stages was approximately equal and no polarization occurred in the diluting chambers.

It is understood that the present disclosure is for the purpose of illustration only and that this invention includes all modifications and equivalents which fall within the scope of the appended claims.

I claim:

1. The apparatus for transferring electrolyte from one solution to another comprising a plurality of diluting and concentrating chambers defined by alternate anion and cation permselective membranes, two end electrodes and electrode chambers, at least one common electrode separating said diluting and concentrating chambers and electrode chamber into groups, means for passing electrolyte solutions through said diluting, concentrating, and electrode chambers, and means for passing a direct electric current transversely through said electrodes, chambers and membranes.

2. The apparatus of claim 1 wherein the two end electrodes are cathodes and the common electrode is an anode.

3. The apparatus of claim 1 wherein the two end electrodes are anodes and the common electrode is a cathode.

4. The apparatus for the deionization of electrolyte solutions comprising a plurality of diluting and concentrating chambers defined by alternate anion and cation permselective membranes, two end electrodes and electrode chambers, a plurality of common electrodes and electrode chambers separating said diluting and concentrating chambers into groups, means for passing electrolyte solutions through said diluting, concentrating and electrode chambers, and means for passing a direct electric current transversely through said electrodes, chambers, and membranes.

5. The apparatus of claim 4 wherein the two end electrodes are both cathodes.

6. The apparatus of claim 4 wherein the two end electrodes are both anodes.

7. The apparatus of claim 4 wherein one end electrode is an anode and one end electrode is a cathode.

8. The apparatus for transferring electrolyte from one solution to another comprising a plurality of juxtaposed internal stages between two end electrodes and electrode chambers, each stage comprising a plurality of alternate diluting and concentrating chambers defined by ion selective membranes, at least one common electrode and electrode chamber separating at least two of said stages, means for passing a direct electric current transversely through said electrodes, chambers, and membranes, means for passing electrolyte solutions through said diluting, concentrating, and electrode chambers, means for combining the effluent from the diluting chambers of one stage and passing the same to the diluting chambers of a subsequent stage, and means for combining the effluent from the concentrating chambers of one stage and passing the same to the concentrating chambers of a subsequent stage.

9. The apparatus of claim 8 wherein the common electrode inserted between at least two stages is a cathode.

10. The apparatus of claim 8 wherein the common electrode inserted between at least two stages is an anode.

11. In an apparatus for transferring electrolyte from one solution to another comprising a plurality of juxtaposed internal stages between two end electrodes and electrode chambers, each stage comprising a plurality of alternate diluting and concentrating chambers defined by ion selective membranes, means for passing a direct electric current transversely through said chambers and membranes, means for passing electrolyte solutions through said diluting, concentrating and electrode chambers, means for combining the effluent from the diluting chambers of one stage and passing the same to the diluting chambers of a subsequent stage, means for combining the effluent from the concentrating chambers of one stage and passing the same to the concentrating chambers of a subsequent stage, the improvement which comprises at least one common electrode and electrode chamber separating at least two of said stages.

12. The apparatus of claim 11 wherein a common anode is disposed between at least two internal stages.

13. The apparatus of claim 11 wherein a common cathode is disposed between at least two internal stages.

14. In the method of transferring electrolyte from one solution to another in an electrodialysis cell comprising: a plurality of diluting and concentrating chambers defined by alternate anion and cation permselective membranes, said cell having two end electrodes and at least one common electrode in an electrode chamber separating groups of concentrating and diluting chambers within said cell, the steps comprising: passing two feed electrolyte solutions through the alternate chambers of one group, separately combining the effluents from said alternate chambers, passing the same through the corresponding chambers of an adjacent group, and passing a direct electric current transversely through said end electrodes and said common intermediate electrode to effect alternate concentration and dilution of said feed electrolytes in adjacent chambers of said cell.

15. The method of claim 14 wherein a direct electric current is passed transversely through a common anode, said permselective membranes and said chambers.

16. The method of claim 14 wherein a direct electric current is passed transversely through a common cathode, said permselective membranes, and said chambers.

17. The method of claim 14 wherein a direct electric current is passed transversely through a plurality of common electrodes, said permselective membranes and said chambers.

18. The method of transferring electrolyte from one solution to another comprising continuously passing two electrolyte solutions through alternate chambers of a unit of an electrodialysis cell having a plurality of concentrating and diluting chambers defined by anion and cation permselective membranes in each unit, said chambers being arranged in juxtaposed internal stages separately collecting and combining the effluents from the concentrating and diluting chambers of each unit and passing the same into the corresponding concentrating and diluting chambers of an adjacent unit, said cell having two end electrodes and electrode chambers and at least one common electrode and electrode chamber separating at least two of said stages, and passing a direct electric current between said end electrodes and said common electrode.

19. An electrodialysis apparatus comprising a plurality of juxtaposed multi-membraned units comprised of a plurality of parallel alternating anion-selective and cation-selective membranes forming alternate diluting and concentrating compartments having inlets and outlets, all the membranes of the apparatus being parallel to each other, manifold conduit means interconnecting the outlets of all the diluting compartments of each unit to the inlets of the diluting compartments of another unit, thereby combining the effluents of the diluting compartments of a unit for passage as influent for the diluting compartments of said other unit, and electric current supplying means consisting of an anode at one end of the apparatus and a cathode at the other end of the apparatus with subsidiary common electrodes separating at least one of said multi-membraned units from the juxtaposed unit thereto of said electrodialysis apparatus for passing a direct current transversely through all the membranes and compartments.

References Cited by the Examiner

UNITED STATES PATENTS

| | | | |
|---|---|---|---|
| 1,885,831 | 11/1932 | Illig et al. | 204—301 X |
| 2,694,680 | 11/1954 | Katz. | |
| 2,752,306 | 6/1956 | Juda et al. | |
| 2,758,083 | 8/1956 | Van Hoek et al. | 204—301 |
| 2,767,135 | 10/1956 | Juda et al. | |
| 2,788,319 | 4/1957 | Pearson | 204—180 |
| 2,802,344 | 8/1957 | Witherell. | |
| 2,812,300 | 11/1957 | Pearson | 204—180 |
| 2,828,257 | 3/1958 | Briggs | 204—301 |
| 2,881,123 | 4/1959 | Zdansky | 204—256 |
| 3,149,062 | 9/1964 | Gottschal et al. | 204—301 |

FOREIGN PATENTS 682,703   11/1952   Great Britain.

JOHN H. MACK, *Primary Examiner.*

JOHN R. SPECK, JOSEPH REBOLD, *Examiners.*